United States Patent
Lee

(10) Patent No.: US 8,837,186 B2
(45) Date of Patent: Sep. 16, 2014

(54) POWER CONVERSION APPARATUS HAVING A BOOST POWER FACTOR CORRECTION (PFC) FUNCTION AND CONTROLLING INRUSH CURRENT AND POWER CONVERSION METHOD THEREOF

(75) Inventor: Jae Ho Lee, Bucheon-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 231 days.

(21) Appl. No.: 13/413,544

(22) Filed: Mar. 6, 2012

(65) Prior Publication Data
US 2012/0230075 A1    Sep. 13, 2012

(30) Foreign Application Priority Data
Mar. 8, 2011   (KR) .................. 10-2010-0020253

(51) Int. Cl.
| H02M 7/155 | (2006.01) |
| H02M 7/04  | (2006.01) |
| H02M 1/42  | (2007.01) |
| H02M 1/36  | (2007.01) |
| H02M 7/06  | (2006.01) |
| H02M 1/08  | (2006.01) |

(52) U.S. Cl.
CPC .......... *H02M 1/4225* (2013.01); *H02M 7/1557* (2013.01); *Y02B 70/126* (2013.01); *H02M 1/36* (2013.01); *H02M 7/066* (2013.01); *H02M 1/081* (2013.01)
USPC ............................................. 363/128; 363/85

(58) Field of Classification Search
CPC ..... H02M 1/36; H02M 1/081; H02M 1/4225; H02M 7/066; H02M 7/1557
USPC ............... 323/222–225; 363/125–128, 84–89
See application file for complete search history.

(56) References Cited

U.S. PATENT DOCUMENTS

| 3,849,718 A | * | 11/1974 | Forster et al. ................. 363/81 |
| 4,021,721 A | * | 5/1977  | Tachibana ..................... 363/128 |
| 4,152,758 A | * | 5/1979  | Bailey et al. ................... 363/85 |

(Continued)

FOREIGN PATENT DOCUMENTS

| JP | 08-214599 | 8/1996 |
| JP | 09-233820 | 9/1997 |

(Continued)

OTHER PUBLICATIONS

Japan Patent Office Application Serial No. 2012-051857, Office Action dated Aug. 6, 2013, 2 pages.

(Continued)

*Primary Examiner* — Timothy J Dole
*Assistant Examiner* — Yusef Ahmed
(74) *Attorney, Agent, or Firm* — Lee, Hong, Degerman, Kang & Waimey

(57) ABSTRACT

An apparatus/method is provided. The power conversion apparatus includes: a rectifying unit including a silicon-controlled rectifier thyristor (SCR) for rectifying single-phase power externally inputted; a power factor correcting unit configured to correct a power factor of the power rectified by the rectifying unit; and a control signal generating unit configured to detect a zero-crossing point based on the single-phase power inputted and generate a pulse single of which a width increases as time elapses based on the detected zero-crossing point. The rectifying unit rectifies the single-phase power by using the pulse signal inputted to a gate terminal of the SCR.

12 Claims, 5 Drawing Sheets

(56) References Cited

U.S. PATENT DOCUMENTS

| | | | | |
|---|---|---|---|---|
| 4,315,305 | A * | 2/1982 | Siemon | 363/88 |
| 4,523,267 | A * | 6/1985 | Mehl | 363/87 |
| 5,005,115 | A * | 4/1991 | Schauder | 363/159 |
| 5,019,952 | A * | 5/1991 | Smolenski et al. | 363/16 |
| 5,191,519 | A * | 3/1993 | Kawakami | 363/71 |
| 5,960,207 | A * | 9/1999 | Brown | 713/300 |
| 5,969,962 | A * | 10/1999 | Gabor | 363/89 |
| 6,055,167 | A * | 4/2000 | Shamkovich et al. | 363/52 |
| 6,222,749 | B1 * | 4/2001 | Peron | 363/125 |
| 6,611,130 | B2 * | 8/2003 | Chang | 323/235 |
| 2002/0047693 | A1 * | 4/2002 | Chang | 323/222 |
| 2002/0154526 | A1 * | 10/2002 | Sakai et al. | 363/132 |
| 2004/0124807 | A1 * | 7/2004 | Nakata et al. | 318/801 |
| 2004/0212355 | A1 * | 10/2004 | Chen | 323/282 |
| 2006/0158912 | A1 * | 7/2006 | Wu et al. | 363/89 |
| 2006/0244426 | A1 * | 11/2006 | Wu et al. | 323/207 |
| 2009/0268496 | A1 * | 10/2009 | Tan et al. | 363/126 |
| 2010/0025995 | A1 * | 2/2010 | Lang et al. | 290/44 |
| 2011/0019452 | A1 * | 1/2011 | Shinomoto et al. | 363/126 |
| 2011/0080104 | A1 * | 4/2011 | Gray et al. | 315/246 |
| 2012/0092900 | A1 * | 4/2012 | Orr | 363/21.03 |
| 2013/0235631 | A1 * | 9/2013 | Pahlevaninezhad et al. | 363/126 |
| 2013/0249469 | A1 * | 9/2013 | Pahlevaninezhad et al. | 320/107 |

FOREIGN PATENT DOCUMENTS

| | | |
|---|---|---|
| JP | 2002027757 | 1/2002 |
| JP | 2005027433 | 1/2005 |
| JP | 2010017062 | 1/2010 |
| KR | 1999-0036603 | 9/1999 |

OTHER PUBLICATIONS

Korean Intellectual Property Office Application Serial No. 10-2011-0020253, Notice of Allowance dated Oct. 30, 2012, 3 pages.

Bo, "Study on Single Phase High Power Factor Rectifier and Control Method Thereof", Moohan College of Science and Engineering, May 2006, 14 pages.

The State Intellectual Property Office of the People's Republic of China Application Serial No. 201210126182.8, Office Action dated Dec. 31, 2013, 11 pages.

Japan Patent Office Application Serial No. 2012-051857, Office Action dated Apr. 7, 2014, 2 pages.

* cited by examiner (a)

(b)

PRIOR ART

POWER CONVERSION APPARATUS HAVING A BOOST POWER FACTOR CORRECTION (PFC) FUNCTION AND CONTROLLING INRUSH CURRENT AND POWER CONVERSION METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2011-0020253, filed on Mar. 8, 2011, the contents of which are hereby incorporated by reference herein in its entirety.

BACKGROUND

The present disclosure relates to a power conversion apparatus, and more particularly, to a power conversion apparatus having a boost power factor correction (PFC) function and controlling inrush current and a power conversion method thereof.

A power conversion apparatus has a boost PFC function for power factor compensation. Herein, the power factor is represented by a ratio of active power to apparent power, i.e., a ratio of power actually flowing to a load to the apparent power.

In the power conversion apparatus having the boost PFC function, inrush current for charging a capacitor on a boost PFC output terminal at the initial time needs to be controlled.

That is, to protect a circuit when power is initially supplied thereto and to optimally design the circuit, the inrush current needs to be controlled.

FIG. 1 is a diagram illustrating power conversion apparatuses according to the related art.

Referring to FIG. 1(A), a power conversion apparatus includes a thermistor 10 for controlling initial inrush current.

The thermistor 10 has a high resistance when temperature is low, but has a low resistance when it is self heated or external temperature increases.

By using these characteristics, the initial inrush current is limited due to the relatively high resistance of the thermistor 10 when power is initially supplied, and when temperature become high, the initial inrush current is limited as the decreased resistance of the thermistor 10 causes construction of a closed circuit.

Although the power conversion apparatus using the thermistor 10 is simple, as illustrated in FIG. 1(A), the power conversion apparatus may not be applied to a high-capacity device as the thermistor 10 is not suitable for the high-capacity device.

Furthermore, efficiency of the power conversion apparatus using the thermistor 10 is degraded due to a loss caused by the resistance of the thermistor 10. Moreover, when the power conversion apparatus is abnormally operated, the temperature of the thermistor 10 may not decrease. In this state, a circuit cannot be separated from a grid, and thus cannot be protected before a fuse is opened.

Referring to FIG. 1(B), a power conversion apparatus includes a resistor 20 and a relay 30 for controlling the initial inrush current.

The power conversion apparatus charges a capacitor $C_B$ by using the resistor 20, and short circuits the relay 30 when the charging of the capacitor $C_B$ is completed so that current flows through the relay 30 instead of the resistor 20, thereby controlling the initial inrush current.

Although the power conversion apparatus using the resistor 20 and relay 30 illustrated in FIG. 1(B) is suitable for the high-capacity device, the power conversion apparatus has a limited life as the relay 30 forms a mechanical contact point.

Furthermore, when the separation from the grid is needed due to abnormal operations, it is difficult to rapidly perform the separation due to a slow response speed of the relay 30.

Moreover, even though the relay 30 is separated, the complete separation from the grid is difficult as current still flows through the resistor 20. Therefore, a relay circuit needs to be additionally connected in series to the resistor, thereby increasing a cost and a volume of a system.

SUMMARY

Embodiments provide a power conversion apparatus capable of efficiently controlling an inrush current which is generated when power is initially connected, and a power conversion method thereof.

Embodiments also provide a power conversion apparatus capable of efficiently controlling the inrush current by adopting a SCR and controlling a gate of the SCR, and a power conversion method thereof.

In one embodiment, a power conversion apparatus includes: a rectifying unit including a silicon-controlled rectifier thyristor (SCR) for rectifying single-phase power externally inputted; a power factor correcting unit configured to correct a power factor of the power rectified by the rectifying unit; and a control signal generating unit configured to detect a zero-crossing point based on the single-phase power inputted and generate a pulse single of which a width increases as time elapses based on the detected zero-crossing point, wherein the rectifying unit rectifies the single-phase power by using the pulse signal inputted to a gate terminal of the SCR.

The control signal generating unit may include: a signal detector configured to detect the single-phase power; a single-phase PLL configured to detect the zero-crossing point based on the single-phase power detected by the signal detector and generate a carrier signal based on the detected zero-crossing point; and a PWM generator configured to compare a reference signal with the carrier signal generated and generate the pulse signal of which the width increases as time elapses.

The single-phase PLL may detect first and second zero-crossing points and may generate the carrier signal which increases as time elapses based on the first and second zero-crossing points detected.

The first zero-crossing point may represent a zero-crossing point where the single-phase power is changed from positive to negative, and the second zero-crossing point may represent a zero-crossing point where the single-phase power is changed from negative to positive.

The carrier signal may include a first carrier signal and a second carrier signal, wherein the first carrier signal may be generated when the first zero-crossing point is detected and may be reset when the second zero-crossing point is detected, and the second carrier signal may be generated when the second zero-crossing point is detected and may be reset when the first zero-crossing point is detected.

The PWM generator may generate the pulse signal while the carrier signal is greater than the reference signal.

The PWM generator may compare the first carrier signal with the reference signal to generate a first pulse signal while the first carrier signal is greater than the reference signal, and may compare the second carrier signal with the reference signal to generate a second pulse signal while the second carrier signal is greater than the reference signal.

The SCR may include: a first SCR of which a gate terminal is connected to the first pulse signal outputted from the PWM generator; and a second SCR of which a gate terminal is connected to the second pulse signal outputted from the PWM generator.

The first and second SCRs may output currents of which intensities are proportional to the widths of the first and second pulse signals by using the first and second pulse signals inputted to the gate terminals, wherein the intensities of the currents may increase as time elapses.

The power conversion apparatus may include a reference signal generator configured to generate the reference signal, wherein the reference signal decreases as time elapses.

In another embodiment, a power conversion method of a power conversion apparatus includes: detecting single-phase power inputted; generating a carrier signal by using a zero-crossing point of the single-phase power detected; generating a pulse signal by comparing the carrier signal with a reference signal; and rectifying the single-phase power inputted by using the pulse signal.

The generating of the carrier signal may include: detecting a plurality of zero-crossing points; and generating the carrier signal which increases as time elapses base on the plurality of zero-crossing points detected.

The detecting of the plurality of zero-crossing points may include: detecting a first zero-crossing point where the single-phase power is changed from positive to negative; and detecting a second zero-crossing point where the single-phase power is changed from negative to positive.

The generating of the carrier signal may include: generating a first carrier signal which is generated when the first zero-crossing point is detected and is reset when the second zero-crossing point is detected; and generating a second carrier signal which is generated when the second zero-crossing point is detected and is reset when the first zero-crossing point is detected, wherein the first and second carrier signals generated increase as time elapses.

The generating of the pulse signal may include generating the pulse signal while the carrier signal is greater than the reference signal according to a result of the comparison between the carrier signal and the reference signal.

The generating of the pulse signal may include: comparing the first carrier signal with the reference signal to generate a first pulse signal while the first carrier signal is greater than the reference signal; and comparing the second carrier signal with the reference signal to generate a second pulse signal while the second carrier signal is greater than the reference signal.

The rectifying may include: inputting the first pulse signal to a gate terminal of a first SCR connected to a positive terminal of the single-phase power; rectifying the single-phase power according to a width of the first pulse signal inputted to the gate terminal of the first SCR; inputting the second pulse signal to a gate terminal of a second SCR connected to a negative terminal of the single-phase power; and rectifying the single-phase power according to a width of the second pulse signal inputted to the gate terminal of the second SCR.

The rectifying of the single-phase power may include outputting currents of which intensities are proportional to the widths of the first and second pulse signals by using the first and second pulse signals inputted to the gate terminals of the first and second SCRs, wherein the intensities of the currents may increase as time elapses.

The power conversion method may include generating and outputting the reference signal, wherein the reference signal may decrease as time elapses.

The details of one or more embodiments are set forth in the accompanying drawings and the description below. Other features will be apparent from the description and drawings, and from the claims.

DETAILED DESCRIPTION OF THE EMBODIMENTS

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Therefore, the description proposed herein is just a preferable example for the purpose of illustrations only, not intended to limit the scope of the invention, so it should be understood that other equivalents and modifications could be made thereto without departing from the spirit and scope of the invention.

According to the present embodiment, a portion of a typical diode rectifier is replaced with a SCR to reduce a size of a circuit, and a life limitation problem of a typical power conversion apparatus having a relay may be solved.

Further, according to the present embodiment, reliability and stability of a power conversion apparatus is improved by rapid separation from a grid during an abnormal operation due to rapid speed of a semiconductor device.

Figure 2:
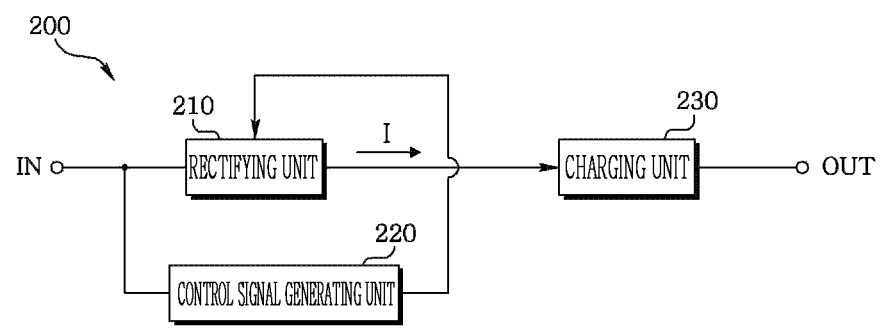
FIG. 2 is a diagram schematically illustrating a power conversion apparatus according to the present embodiment.

FIG. 2 is a diagram schematically illustrating a power conversion apparatus according to the present embodiment.

Referring to FIG. 2, the power conversion apparatus includes an inrush current restricting unit 200.

The inrush current restricting unit 200 includes a rectifying unit 210, a control signal generating unit 220, and a charging unit 230.

Single-phase power may be connected to an input terminal of the power conversion apparatus illustrated in FIG. 2. Further, the single-phase power inputted is supplied to the rectifying unit 210 and the control signal generating unit 220.

The rectifying unit 210 rectifies the single-phase power and outputs the rectified power to the charging unit 230.

The control signal generating unit 220 generates a control signal for controlling the rectifying unit 210. More specifically, the control signal generating unit 220 may generate the control signal for controlling the inrush current flowing to the charging unit 230 by processing the single-phase power.

The charging unit 230 stores a current outputted from the rectifying unit 220 as electric energy. Herein, due to an operation of the rectifying unit 210 in response to the control signal of the control signal generating unit 220, the inrush current is not supplied to the charging unit 230.

That is, the control signal generating unit 220 generates the control signal for controlling the rectifying unit 210, and the rectifying unit 210 is operated according to the control signal to thereby restrict intensity of a current I flowing out from the rectifying unit 210.

Meanwhile, a digital controller, for example, a digital signal processor (DSP), is typically required to control overall operations of the power conversion apparatus. However, for conciseness, this controller is not illustrated in the drawing.

The control signal generated by the control signal generating unit 220 restricts an amount of the current rectified by the rectifying unit 210 from the initialization time when the single-phase power is inputted.

That is, if the rectifying unit 210 is operated without the control signal, the inrush current is generated when the single-phase is initially inputted. This generated inrush current flows into the charging unit 230, thereby damaging the charging unit 230.

Therefore, in the present embodiment, the control signal for controlling the rectifying unit 210 is generated to efficiently restrict the inrush current.

Herein, the rectifying unit 210 consists of a diode, and the control signal generating unit 220 generates the control signal for controlling the rectifying unit 210 by using characteristics of the diode included in the rectifying unit 210.

In the present embodiment, the rectifying unit 210 is configured by using a silicon-controller rectifier thyristor (SCR), and the control signal generated by the control signal generating unit 220 is inputted to a gate of the SCR to thereby control the intensity of the current I rectified by the rectifying unit 210.

Figure 3:
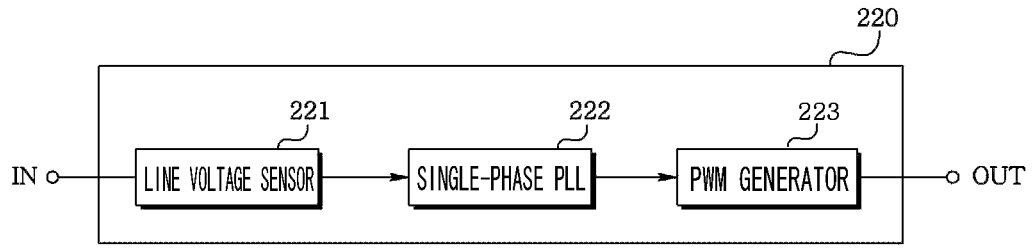
FIG. 3 is a diagram illustrating a detailed structure of a control signal generating unit illustrated in FIG. 2.

FIG. 3 is a diagram illustrating a detailed structure of the control signal generating unit illustrated in FIG. 2.

Referring to FIG. 3, the control signal generating unit 220 includes: a line voltage sensor 221 which detects a line voltage; a single-phase PLL 222 which traces a phase of the line voltage detected by the line voltage sensor 221 to generate a carrier signal; and a PWM generator 223 which compares the carrier signal generated by the single-phase PLL 222 with a reference signal to generated a pulse signal.

When the power is connected to the input terminal of the inrush current restricting unit 200, the line voltage sensor 221 measures the line voltage of the power.

Herein, when the power connected to the inrush current restricting unit 200 is single-phase AC power, the line voltage sensor 221 detects a sine wave of the power.

The single-phase PLL 222 traces the phase of the sine wave detected by the line voltage sensor 221 to detect a zero-crossing point of the sine wave.

Further, when the zero-crossing point is detected, the single-phase PLL 222 detects whether the detected sine wave is positive or negative by using the detected zero-crossing point.

Herein, the single-phase PLL 222 generates the carrier signal which increases at a constant rate from a first zero-crossing point to a second zero-crossing point of the detected sine wave. For instance, if the carrier signal is generated at the first zero-crossing point by the single-phase PLL 222, the carrier signal is maximized when the second zero-crossing point is detected.

Further, the carrier signal is reset to have a value of 0 when the carrier signal is maximized, i.e., when the second zero-crossing point is detected.

The PWM generator 223 compares the reference signal to the carrier signal, and generates the pulse signal according to a result of the comparison.

Herein, a reference signal generator (not illustrated) generates the reference signal. The reference signal generator may be included in the PWM generator 223, or may separately exist in the outside to generate the reference signal.

The reference signal may have various forms.

That is, in one embodiment, the reference signal may have such a form as to decrease at a constant rate.

The PWM generator 223 compares the reference signal to the carrier signal, and generates the pulse signal according to the result of the comparison while the carrier signal is greater than the reference signal.

The generated pulse signal is the control signal inputted to the gate of the SCR provided to the rectifying unit 210.

That is, the pulse signal generated by the PWM generator 223 is inputted to the gate of the SCR provided to the rectifying unit 210, and the intensity of the current rectified by the rectifying unit 210 is controlled according to the pulse signal.

Figure 4:
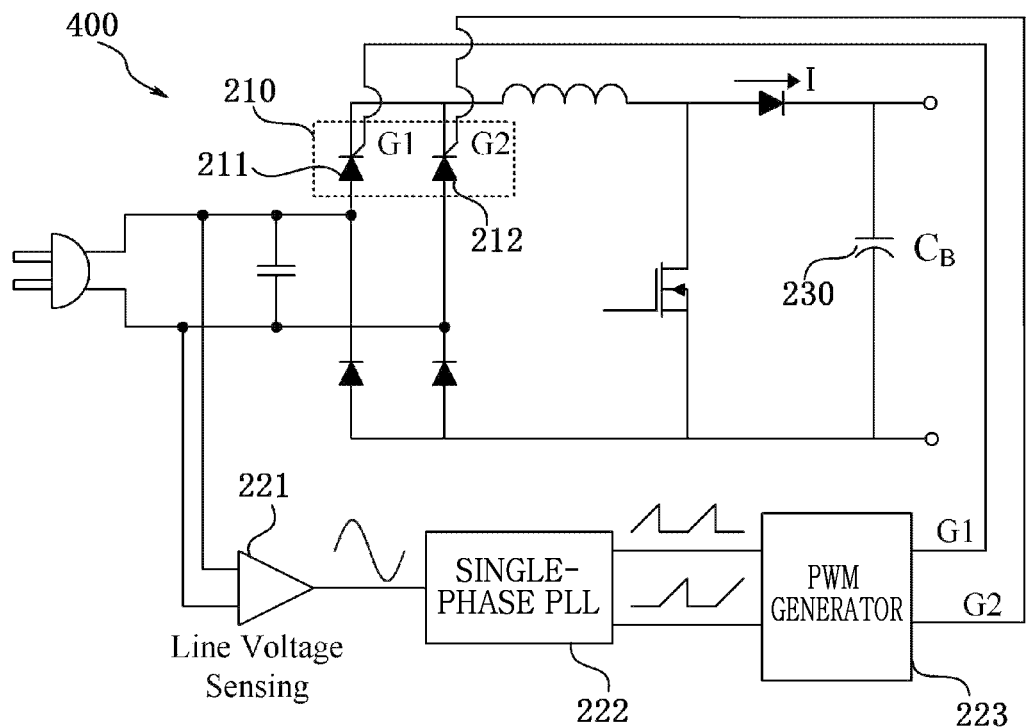
FIG. 4 is a diagram illustrating the power conversion apparatus according to the present embodiment in detail.

FIG. 4 is a diagram illustrating the power conversion apparatus according to the present embodiment in detail. That is, FIG. 4 illustrates the detailed structures of the units illustrated in FIGS. 2 and 3.

Figure 1:
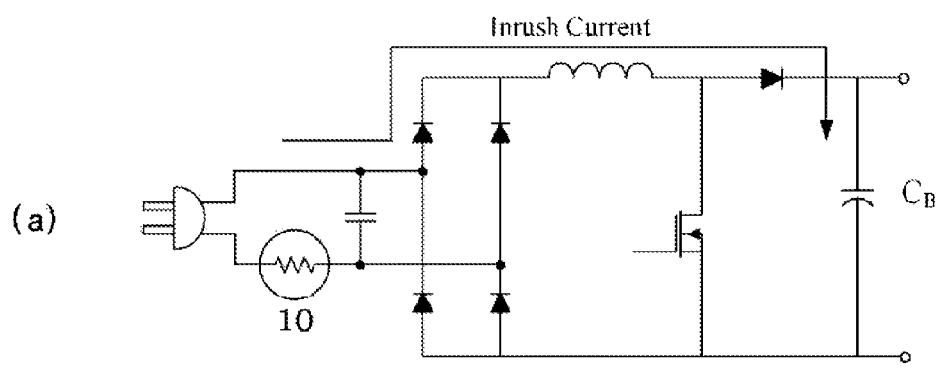
FIG. 1 is a diagram illustrating a power conversion apparatus according to the related art.
Figure 1:
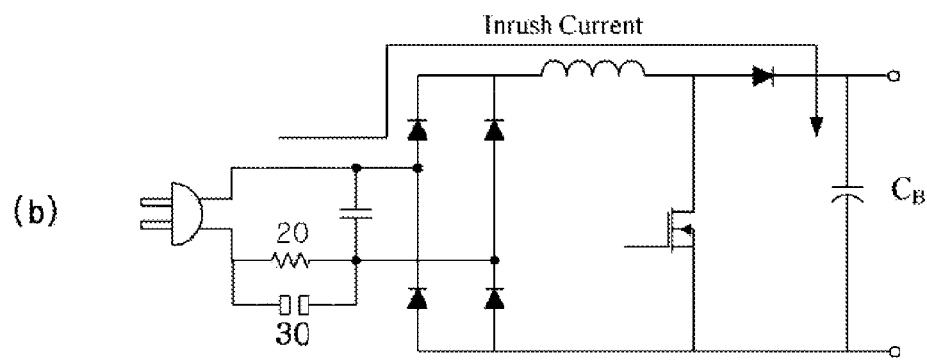

Referring FIG. 4, a power conversion apparatus 400 according to the present embodiment has a different structure from the structures of the power conversion apparatuses illustrated in FIGS. 1(A) and 1(B).

The power conversion apparatus 400 includes the rectifying unit 210 connected to the single-phase power and the control signal generating unit 220.

Herein, the single-phase power inputted to the control signal generating unit 220 may be detected by the line voltage sensor 221.

The single-phase PLL 222 traces the phase of an output of the line voltage sensor 221 to detect the zero-crossing point. The single-phase PLL 222 generates the carrier signal which increases at a constant rate between adjacent zero-crossing points.

For instance, a timer is started at the first zero-crossing point and the carrier signal is such generated as to increase at a constant rate as time elapses. Then, at the second zero-crossing point, the timer is stopped and the amplitude of the carrier signal is reset to 0. Herein, the first and second zero-crossing points mean continuous zero-crossing points according to the output of the line voltage sensor 221.

The single-phase PLL 222 detects the first zero-crossing points and the second zero-crossing points by using the output of the line voltage sensor 221.

The single-phase PLL 222 detects a zero-crossing point Pp (Pp,1, . . . , Pp,n) (hereinafter, referred to as 'first zero-crossing point) at a phase transition point from positive to negative, and detects a zero-crossing point Pn (Pn,1, . . . , Pn,n) (hereinafter, referred to as 'second zero-crossing point) at a phase transition point from negative to positive. That is, the first zero-crossing point represents a zero-crossing point where the single-phase power is changed from positive to negative, and the second zero-crossing point represents a zero-crossing point where the single-phase power is changed from negative to positive.

The single-phase PLL 222 classifies the detected zero-crossing points into Pp and Pn, and generates a carrier signal 1 which is started at Pp and is terminated at Pn and a carrier signal 2 which is started at Pn and is terminated at Pp.

The carrier signal 1 is outputted during a period of from Pn,1 to Pp,1. This outputted carrier signal 1 gradually increases at a constant rate as time elapses.

The carrier signal 2 is outputted during a period of from Pp,1 to Pn,2. This outputted carrier signal 2 gradually increases at a constant rate as time elapses.

Therefore, the carrier signals 1 and 2 are not simultaneously outputted, and are inputted to the PWM generator 223 through different paths (e.g., a first path and a second path).

The carrier signal 1 is inputted to a gate of a first SCR 211 of the rectifying unit 210 through the PWM generator 223 described below, and the carrier signal 2 is inputted to a gate of a second SCR 212 of the rectifying unit 210 through the PWM generator 223.

Accordingly, the carrier signal 1 is generated when the first zero-crossing point is detected, and is reset when the second zero-crossing point is detected. The carrier signal 2 is generated when the second zero-crossing point is detected, and is reset when the first zero-crossing point is detected.

The first SCR 211 is connected to a positive terminal of the single-phase power, and the second SCR 212 is connected to a negative terminal of the single-phase power. Accordingly, the first SCR 211 performs the rectifying operation based on the pulse signal inputted through the PWM generator 223 when the single-phase power is positive. The second SCR 212 performs the rectifying operation based on the pulse signal inputted through the PWM generator 223 when the single-phase power is negative.

Figure 5:
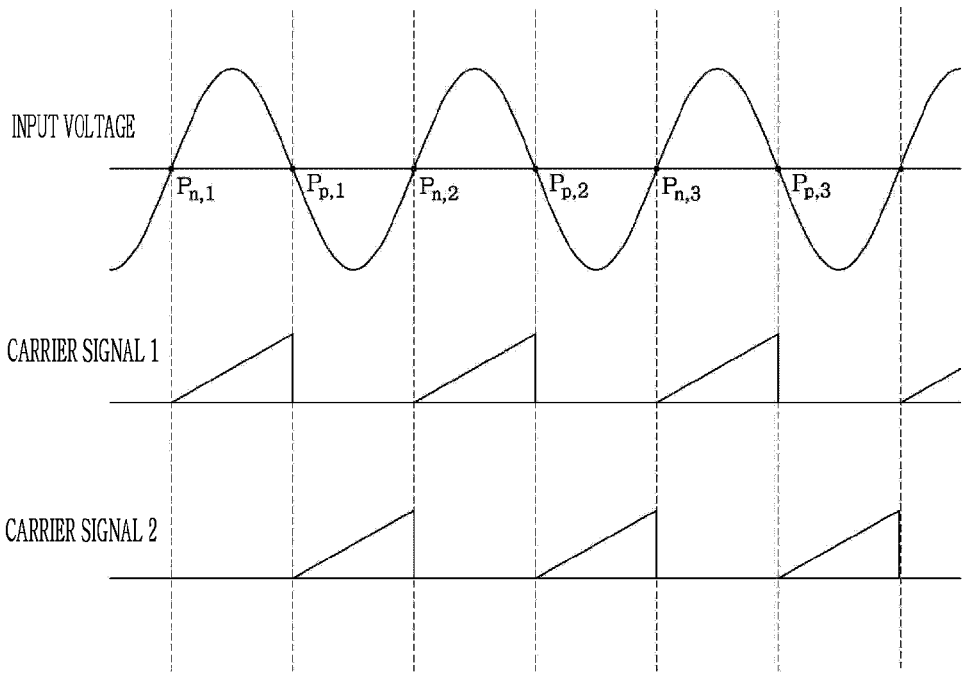
FIG. 5 is a diagram illustrating input/output states of carrier signals generated according to the present embodiment.

The carrier signals generated by the single-phase PLL 222 are illustrated in FIG. 5.

That is, when the single-phase power is positive, the single-phase PLL 222 generates the carrier signal 1 which gradually increases as time elapses.

On the contrary, when the single-phase power is negative, the single-phase PLL 222 generates the carrier signal 2 which gradually increases as time elapses.

Herein, the carrier signal 1 is generated until the single-phase power is changed from positive to negative, and then is reset. The carrier signal 2 is generated until the single-phase power is changed from negative to positive, and then is reset.

Herein, the carrier signal 1 is for generating a control signal inputted to the first SCR 211, and the carrier signal 2 is for generating a control signal inputted to the second SCR 212.

The PWM generator 223 compares the reference signal to the carrier signal to generate the pulse signal. The reference signal decreases at a constant rate as time elapses. That is, unlike the carrier signal, the reference signal decreases regardless of the zero-crossing point as time elapses.

The PWM generator 223 compares the reference signal to the carrier signal 1 and compares the reference signal to the carrier signal 2 to generate pulse signals according to results of the comparisons. That is, the pulse signals include a first pulse signal and a second pulse signal, and the first pulse signal, which is generated according to the result of the comparison between the carrier signal 1 and the reference signal, is inputted to the first SCR 211. The second pulse signal, which is generated according to the result of the comparison between the carrier signal 2 and the reference signal, is inputted to the second SCR 212.

Herein, the PWM generator 223 compares the amplitude of the reference signal with respective amplitudes of the carrier signals 1 and 2, and respectively generates the pulse signals while either of the amplitudes of the carrier signals 1 and 2 is greater than that of the reference signal.

That is, since the amplitude of the reference signal decreases at a constant rate as time elapses, the widths of the pulse signals generated by the PWM generator 223 are narrow at the initial time when the single-phase power is connected, and gradually become wider as time elapses.

The pulse signals generated by the PWM generator 223 are inputted to the gate terminals of the first and second SCRs 211 and 212 of the rectifying unit 210.

That is, since the PWM generator 223 generates the pulse signals of which the widths increase as time elapses, conduction periods of the first and second SCRs 211 and 212 included in the rectifying unit 210 become longer.

That is, the PWM generator 223 compares the carrier signal 1 with the reference signal, and generates the first pulse signal while the amplitude of the carrier signal 1 is greater than that of the reference signal.

The PWM generator 223 compares the carrier signal 2 with the reference signal, and generates the second pulse signal while the amplitude of the carrier signal 2 is greater than that of the reference signal.

Therefore, the intensities of the currents passing through the first and second SCRs 211 and 212 may gradually increase as time elapses, thereby controlling the intensity of the inrush current flowing to the capacitor $C_B$.

Figure 6:
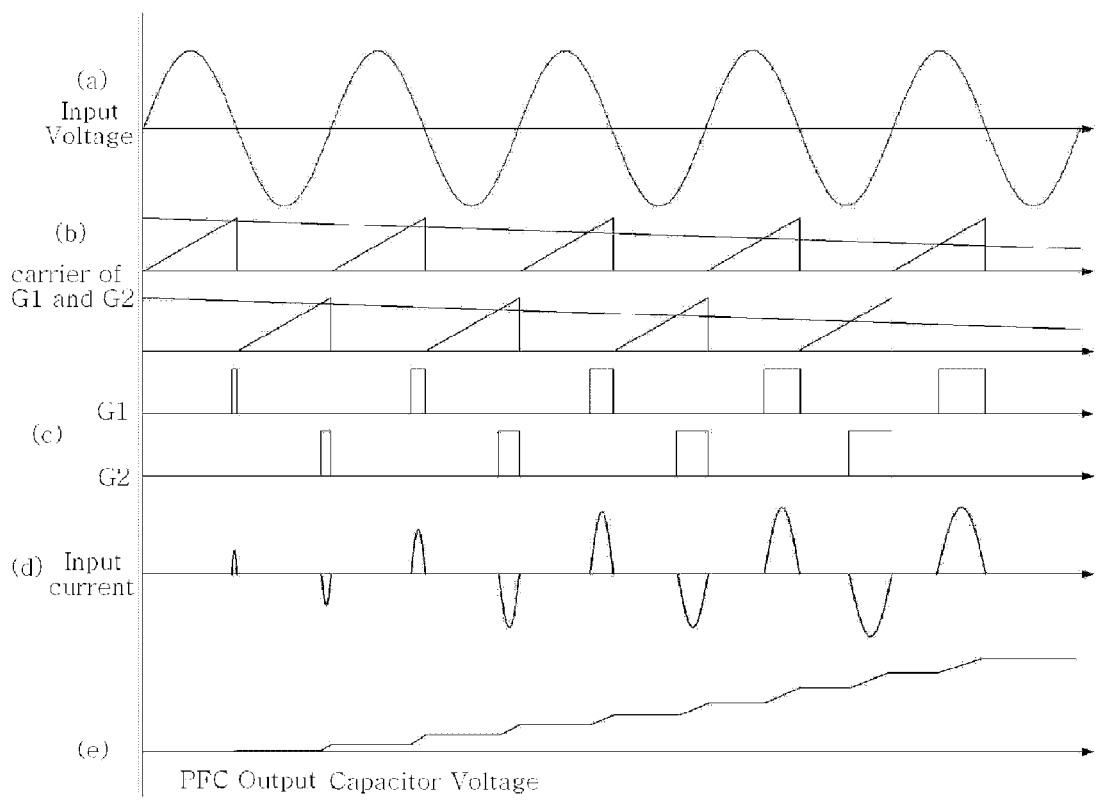
FIG. 6 is a diagram illustrating input/output states of signals generated according to the present embodiment.

FIG. 6 is a diagram illustrating input/output states of the signals generated according to the present embodiment.

When the single-phase power is connected to the power conversion apparatus 400, the line voltage sensor 221 detects a line voltage of the single-phase power.

FIG. 6(A) illustrates the line voltage detected by the line voltage sensor 221.

FIG. 6(B) illustrates the reference signal and the carrier signals.

The carrier signals may be generated according to a signal of the line voltage detected by the line voltage sensor 221. Herein, as illustrated in FIG. 6(A), the line voltage signal is a since wave, and thus continuously crosses zero points of the x-axis in the time domain. The points crossing zero points are the zero-crossing points of the present embodiment.

The single-phase PLL 222 detects the zero-crossing point Pn where the line voltage signal is changed from negative to positive and detects the zero-crossing point Pp where the line voltage signal is changed from positive to negative. Herein, the zero-crossing points Pn and Pp alternate with each other.

When the zero-crossing points Pn and Pp are detected, the single-phase PLL 222 generates the carrier signal 1 which is started at the crossing point Pn and is terminated at the crossing point Pp.

The single-phase PLL 222 also generates the carrier signal 2 which is started at the crossing point Pp and is terminated at the crossing point Pn.

The carrier signals 1 and 2 are illustrated in FIG. 6(B). The two carrier signals generated by the single-phase PLL 222 are inputted to the PWM generator 223 through different paths.

The PWM generator 223 compares the reference signal to the carrier signals 1 and 2, and generates the pulse signals according to the result of the comparisons.

Herein, the reference signal decreases at a constant rate as time elapses, but is not limited thereto.

The PWM generator 223 compares the amplitude of the reference signal with respective amplitudes of the carrier signals 1 and 2, and respectively generates the pulse signals while either of the amplitudes of the carrier signals 1 and 2 is greater than that of the reference signal.

Herein, since the reference signal decreases as time elapses, the widths of the pulse signals outputted increase as time elapses.

The pulse signals generated by the PWM generator 223 are illustrated as G1 and G2 in FIG. 6(C). These pulse signals generated by the PWM generator 223 are inputted to the first and second SCRs 211 and 212 of the rectifying unit 210.

Herein, when the amplitudes of the pulse signals inputted to the gate terminals of the first and second SCRs 211 and 212 are greater than certain values, the first and second SCRs 211 and 212 are operated as typical diodes.

Therefore, when the pulse signal G1 is inputted to the gate terminal of the first SCR 211, the first SCR 211 is turned on to thereby establish a closed circuit and pass the current I toward the charging unit 230 or capacitor $C_B$.

Further, when the pulse signal G1 is terminated, reverse voltages are applied to both terminals of the first SCR 211 due to the input voltage, and thus the first SCR 211 is turned off. The second SCR 212 may also be operated in this manner.

Therefore, only at moments when the pulse signals are inputted to the gate terminals, the first and second SCRs 211 and 212 are turned on, thereby establishing closed circuits.

Accordingly, the current I flows during a period of time corresponding to the widths of the pulse signals inputted, and thus has the waveform illustrated in FIG. 6(D).

In this manner, the inrush current flowing to an output capacitor of a boost PFC is restricted while the capacitor is charged. Then, the charging is stopped when a charging voltage is the same as a maximum value of the input voltage. FIG. 6(E) illustrates voltages on both terminals of the charged capacitor.

Further, when the charging is completed, a voltage is inputted to the gate terminal of the SCR so that the SCR is always turned on and is operated as a typical diode rectifier.

This operation may be easily controlled by using the digital controller without adding a circuit to the power conversion apparatus.

Further, in an abnormal state, the gate terminal of the SCR is cut off so as to be rapidly separated from the single-phase power.

Herein, when the gate terminal is cut off, since an output voltage is higher than an input voltage, the SCR is reversely biased. Therefore, the turning off operation may be rapidly performed.

Therefore, in comparison with a typical circuit using a relay circuit, cutoff of power may be more rapidly performed. Therefore, damage to a circuit may be minimized. Further, since a semiconductor device used in the present embodiment, the life of the apparatus may be permanent in comparison with the use of a mechanical relay circuit.

Figure 7:
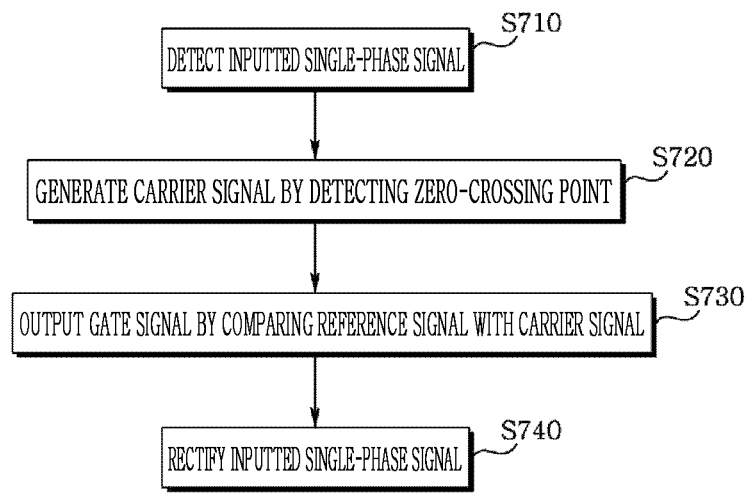
FIG. 7 is a flow chart illustrating a power conversion method of the power conversion apparatus according to the present embodiment.

FIG. 7 is a flow chart illustrating a power conversion method of the power conversion apparatus according to the present embodiment.

The method includes operation S710 for detecting a single-phase signal inputted; operation S720 for generating a carrier signal by detecting a zero-crossing point of the detected single-phase signal; operation S730 for outputting a gate signal by comparing a reference signal with the carrier signal; and operation S740 for receiving the gate signal and rectifying the single-phase signal.

In operation S710, a waveform of the single-phase power is detected.

In operation S720, zero-crossing points on the detected waveform of the single-phase power are detected. The zero-crossing points may be classified into a zero-crossing point Pn (Pn,1 to Pn,n) where the waveform is changed from negative to positive and a zero-crossing point Pp (Pp,1 to Pp,n) where the waveform is changed from positive to negative.

Further, in operation S720, the carrier signal 1 is outputted during a period of from Pn,1 to Pp,1 and the carrier signal 2 is outputted during a period of from Pp,1 to Pn,2. Further, in operation S720, the carrier signal 1 may be generated during a period of from Pn,2 to Pp,2 and the carrier signal 2 may be generated during a period of from Pp,2 to Pn,3.

In other words, in operation S720, the carrier signals 1 and 2 are outputted by using the detected zero-crossing points.

These carrier signals 1 and 2 are illustrated in FIG. 6(B).

Next, in operation S730, the reference signal is compared to the carrier signals to generate gate signals. The PWM generator 223 compares the reference signal to the carrier signals, and respectively generates the pulse signals only when either of the carrier signals is greater than the reference signal. The generated pulse signals are illustrated in FIG. 6(C).

Next, in operation S740, the pulse signals are inputted as gate signals to rectify a single-phase signal inputted from the outside. As illustrated in FIG. 6(D), the intensity of the current rectified gradually increases as time elapses after the single-phase power is inputted.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A power conversion apparatus comprising:
a rectifying unit comprising a silicon-controlled rectifier thyristor (SCR) for rectifying externally input single-phase power;
a power factor correcting unit configured to correct a power factor of the rectified power;
a signal detector configured to detect the single-phase power;
a single-phase PLL configured to detect first and second zero-crossing points based on the detected single-phase power and to generate a carrier signal that increases as time elapses based on the detected first and second zero-crossing points; and
a PWM generator configured to compare a reference signal with the generated carrier signal and to generate a pulse signal having a width that increases as time elapses,
wherein the rectifying unit rectifies the single-phase power by using the generated pulse signal input to a gate terminal of the SCR,
wherein the single-phase PLL detects the first zero-crossing point where the single-phase power changes from positive to negative and detects the second zero-crossing point where the single-phase power changes from negative to positive, and
wherein the single-phase PLL generates the carrier signal by:
generating a first carrier signal when the first zero-crossing point is detected and resetting the first carrier signal when the second zero-crossing point is detected; and
generating a second carrier signal when the second zero-crossing point is detected and resetting the second carrier signal when the first zero-crossing point is detected.

2. The power conversion apparatus according to claim 1, wherein the PWM generator generates the pulse signal while the generated carrier signal is greater than the reference signal.

3. The power conversion apparatus according to claim 1, wherein:
the PWM generator compares the first carrier signal with the reference signal to generate a first pulse signal while the first carrier signal is greater than the reference signal; and
the PWM generator compares the second carrier signal with the reference signal to generate a second pulse signal while the second carrier signal is greater than the reference signal.

4. The power conversion apparatus according to claim 3, wherein the SCR comprises:
a first SCR having a gate terminal connected to the first pulse signal output from the PWM generator; and
a second SCR having a gate terminal connected to the second pulse signal output from the PWM generator.

5. The power conversion apparatus according to claim 4, wherein:
the first and second SCRs output currents having intensities that are proportional to the widths of the first and second pulse signals by using the first and second pulse signals input to the gate terminals of the first and second SCR and;
the intensities of the currents increase as time elapses.

6. The power conversion apparatus according to claim 1, further comprising a reference signal generator configured to generate the reference signal, wherein the reference signal decreases as time elapses.

7. A power conversion method of a power conversion apparatus, the power conversion method comprising:
detecting externally input single-phase power;
detecting a plurality of zero-crossing points based on the detected single-phase power;
generating a carrier signal that increases as time elapses based on the detected plurality of zero-crossing points;
generating a pulse signal by comparing the generated carrier signal with a reference signal; and
rectifying the single-phase power by using the generated pulse signal,
wherein detecting the plurality of zero-crossing points comprises:
detecting a first zero-crossing point where the single-phase power changes from positive to negative; and
detecting a second zero-crossing point where the single-phase power changes from negative to positive, and
wherein generating the carrier signal comprises:
generating a first carrier signal when the first zero-crossing point is detected and resetting the first carrier signal when the second zero-crossing point is detected; and
generating a second carrier signal when the second zero-crossing point is detected and resetting the second carrier signal when the first zero-crossing point is detected.

8. The power conversion method according to claim 7, wherein the pulse signal is generated while the generated carrier signal is greater than the reference signal.

9. The power conversion method according to claim 7, wherein generating the pulse signal comprises:
comparing the first carrier signal with the reference signal and generating a first pulse signal while the first carrier signal is greater than the reference signal; and
comparing the second carrier signal with the reference signal and generating a second pulse signal while the second carrier signal is greater than the reference signal.

10. The power conversion method according to claim 9, wherein rectifying the single-phase power:
inputting the first pulse signal to a gate terminal of a first SCR connected to a positive terminal of the single-phase power;
rectifying the single-phase power according to a width of the first pulse signal;
inputting the second pulse signal to a gate terminal of a second SCR connected to a negative terminal of the single-phase power; and
rectifying the single-phase power according to a width of the second pulse signal.

11. The power conversion method according to claim 10, wherein:
rectifying the single-phase power comprises outputting currents having intensities that are proportional to the widths of the first and second pulse signals by using the first and second pulse signals input to the gate terminals of the first and second SCR; and
the intensities of the currents increase as time elapses.

12. The power conversion method according to claim 7, further comprising generating and outputting the reference signal, wherein the reference signal decreases as time elapses.

* * * * *